Dec. 3, 1935.  W. F. HEINEMAN  2,022,912
MACHINE FOR FORMING AUTOMOBILE FRAMES AND THE LIKE
Filed Oct. 7, 1933  6 Sheets-Sheet 3
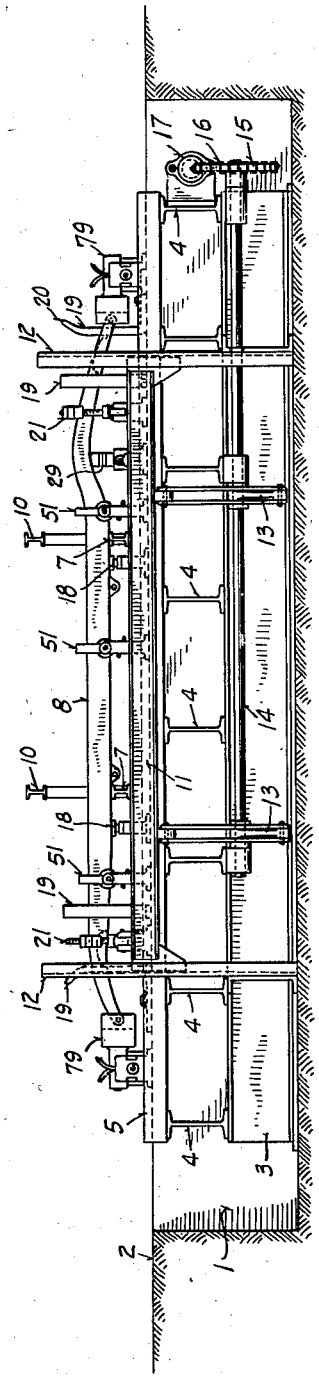
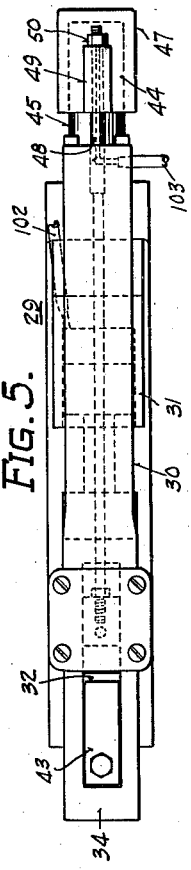
INVENTOR.
Warren F. Heineman
BY
ATTORNEY.

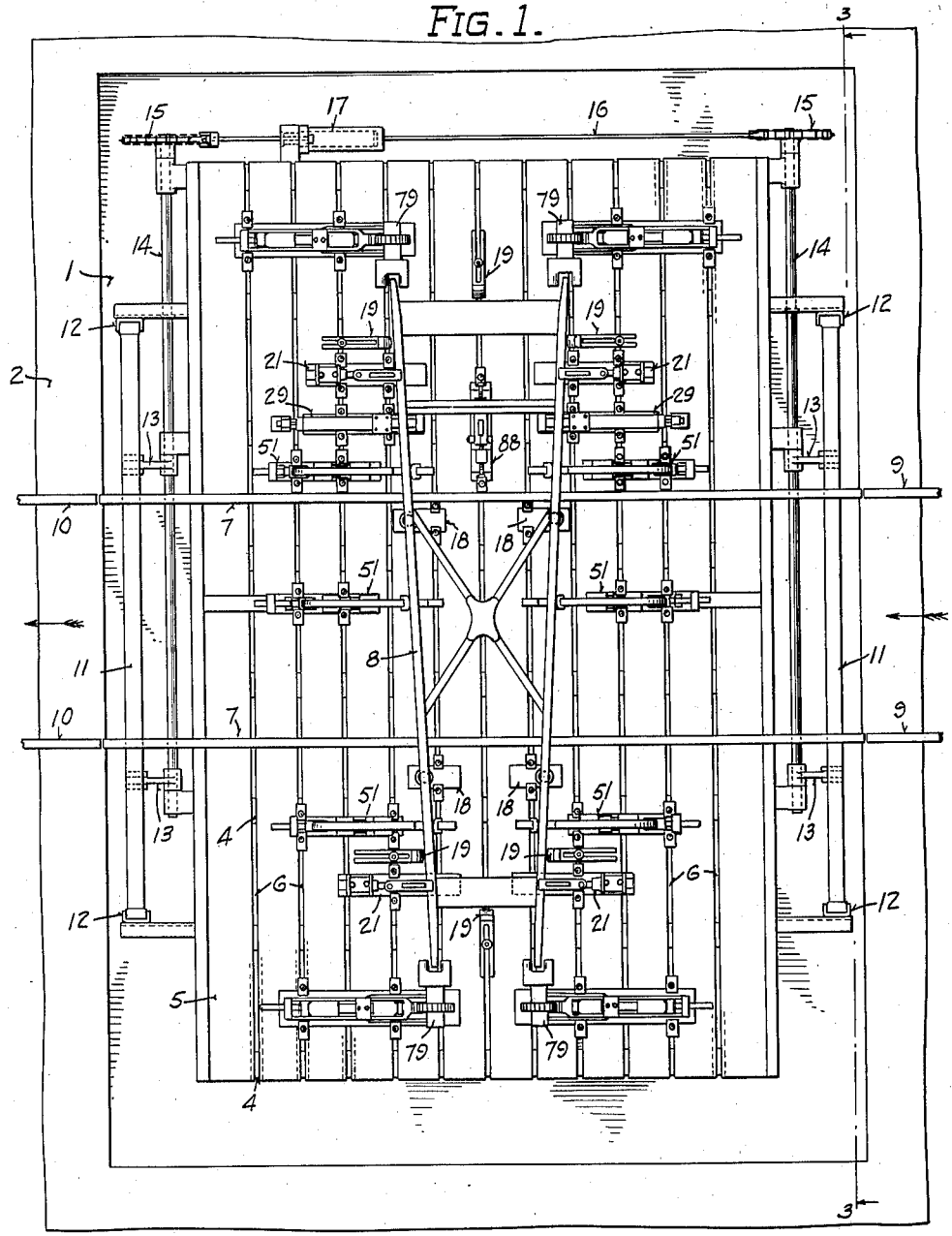

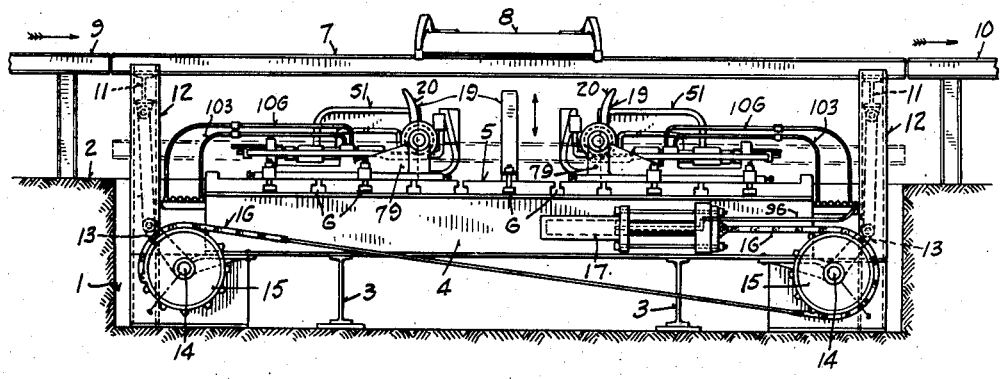

Dec. 3, 1935. W. F. HEINEMAN 2,022,912
MACHINE FOR FORMING AUTOMOBILE FRAMES AND THE LIKE
Filed Oct. 7, 1933 6 Sheets-Sheet 4
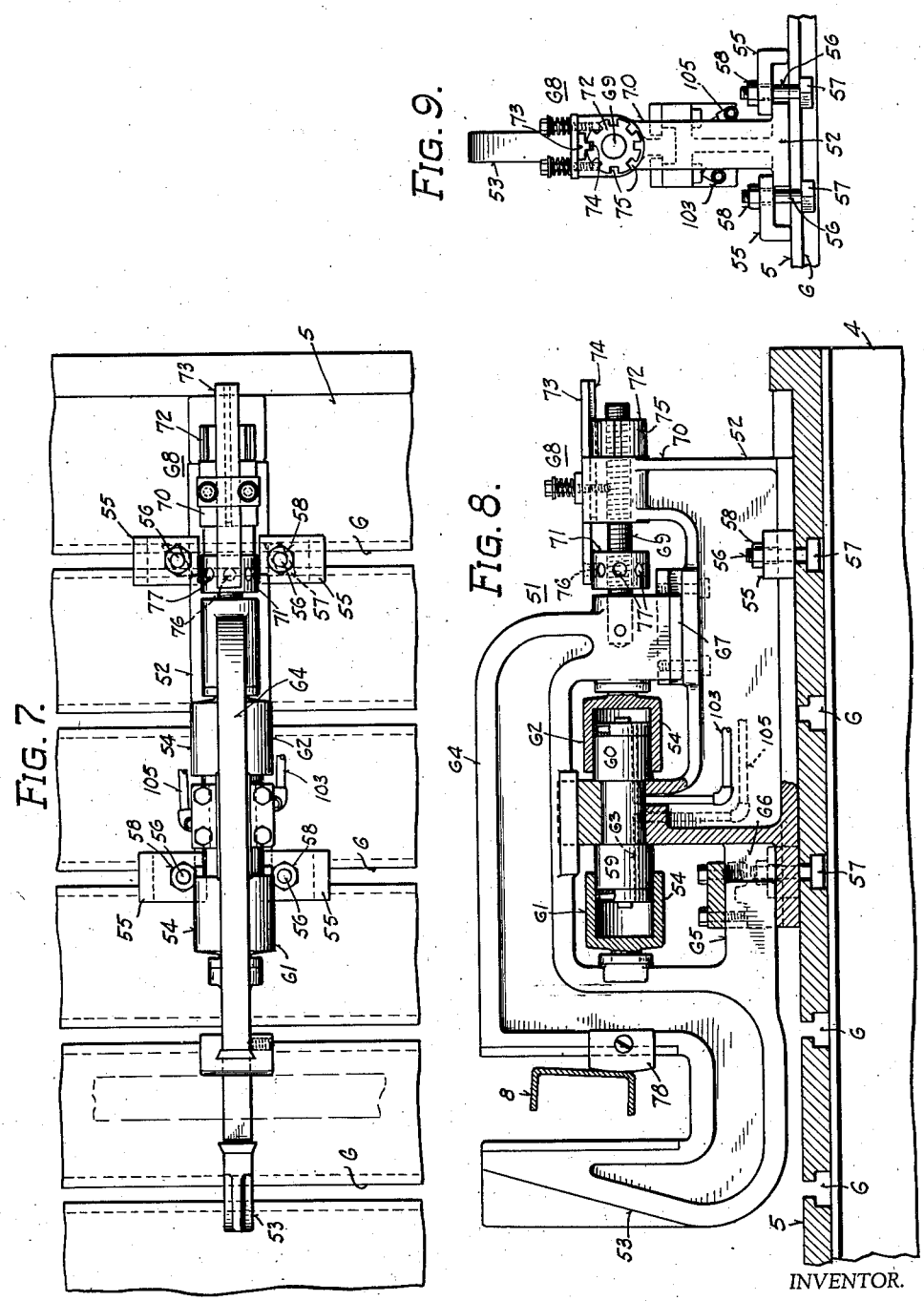
INVENTOR.
Warren F. Heineman
BY
ATTORNEY.

Dec. 3, 1935.  W. F. HEINEMAN  2,022,912
MACHINE FOR FORMING AUTOMOBILE FRAMES AND THE LIKE
Filed Oct. 7, 1933    6 Sheets-Sheet 5
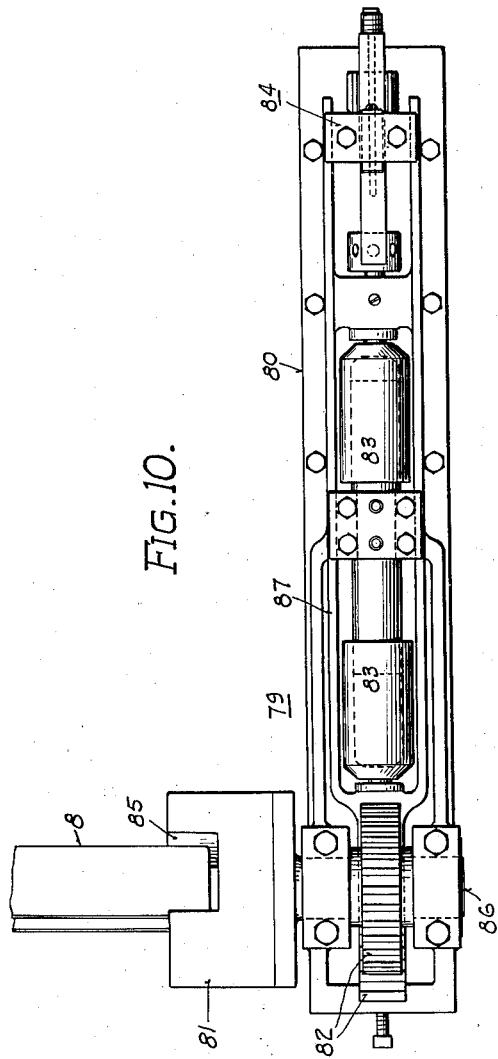
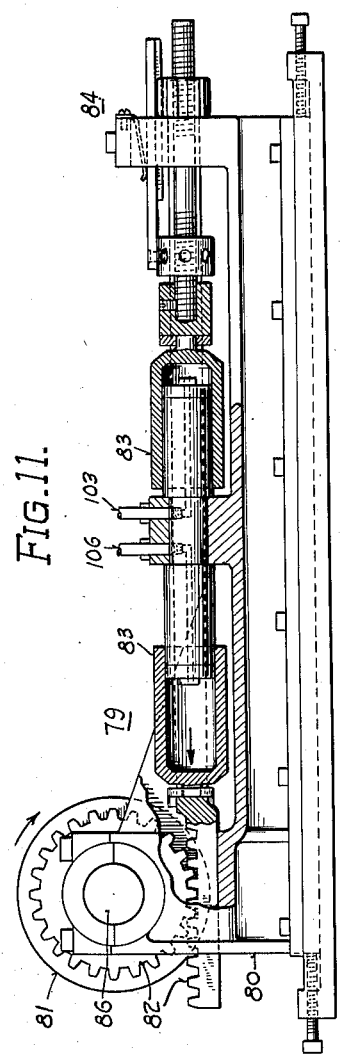
INVENTOR.
Warren F. Heineman
BY
ATTORNEY.

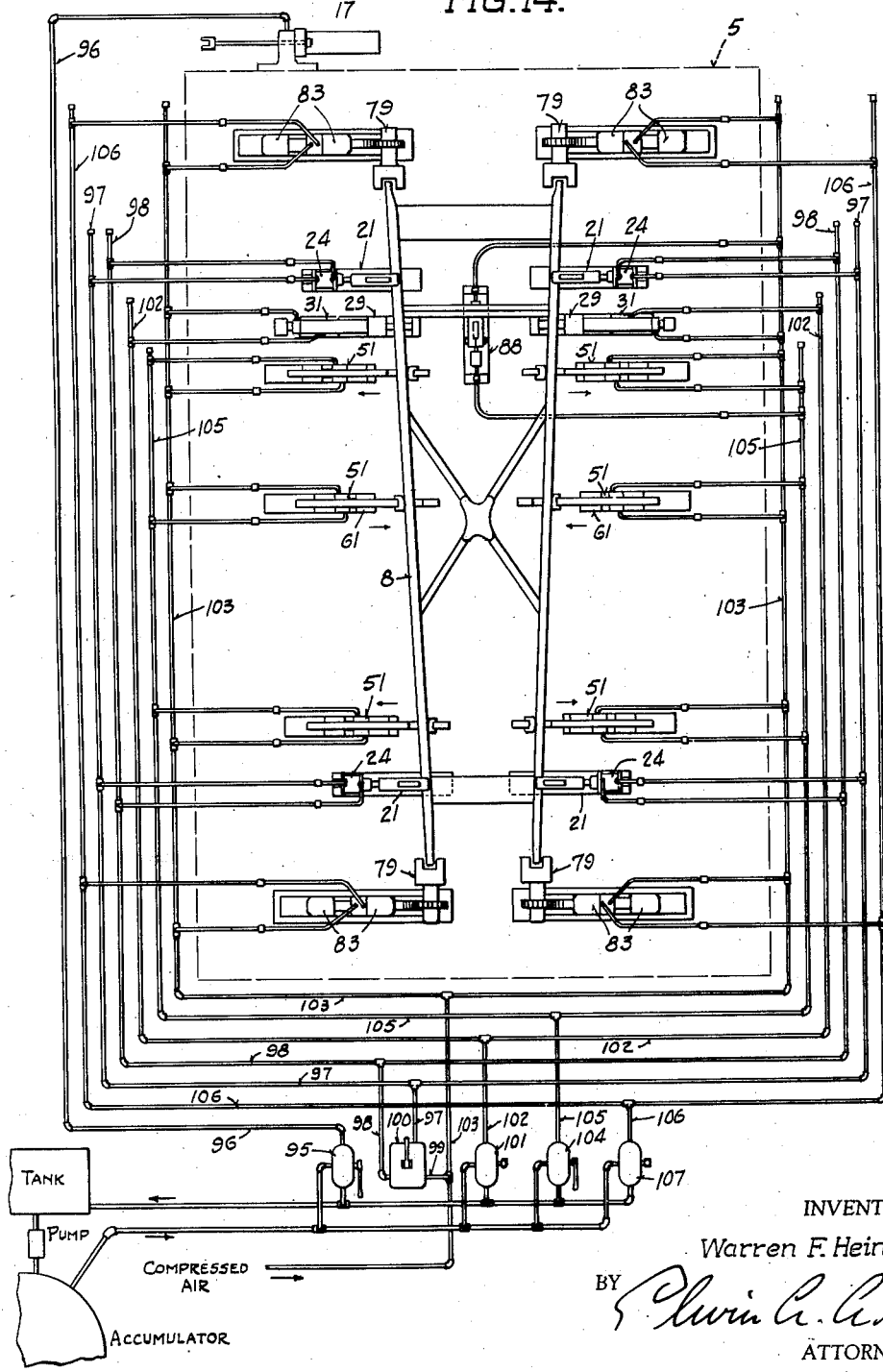

Patented Dec. 3, 1935

2,022,912

UNITED STATES PATENT OFFICE 2,022,912

MACHINE FOR FORMING AUTOMOBILE FRAMES AND THE LIKE

Warren F. Heineman, Shorewood, Wis., assignor to A. O. Smith Corporation, Milwaukee, Wis., a corporation of New York Application October 7, 1933, Serial No. 692,583

19 Claims. (Cl. 153—32)

This invention relates to machines for forming automobile frames and the like, and has application more particularly in the manufacture of such frames where it is desired to have all of the frames of a particular size and kind identical in shape.

Automobile frames are chiefly made of pressed channel section steel structural members of various shapes riveted or welded together. The accuracy in dimension and shape for any given type of frame is very important to the riding qualities of the car, and an attempt is made in the manufacture of frames to have the completed frames of a given type as near alike as possible.

In many instances it becomes expensive to perform the fabricating operations with the accuracy required and to obtain the desired uniformity.

The object of the present invention is to provide a machine which will form a roughly fabricated frame to accurate dimensions and shape.

Another object is to provide such a machine which will form all of the frames of a given size and kind alike.

Another object is to provide such a machine with features permitting ready adjustment to accommodate frames of different size and kind.

Other objects will appear hereinafter.

The accompanying drawings illustrate a machine constructed in accordance with the invention, and Figure 1 is a top plan view of the machine showing a frame in place for forming;

Fig. 2 is an end elevation of the machine;

Fig. 3 is a side elevation of the machine taken on line 3—3 of Fig. 1;

Fig. 4 is a side elevation of a hold-down hook;

Fig. 5 is a top plan view of a raising jack;

Fig. 6 is a central longitudinal section of the raising jack;

Fig. 7 is a top plan view of a horizontal bending jack;

Fig. 8 is a side elevation of the horizontal bending jack with parts in section to show the detail of construction;

Fig. 9 is an end elevation of the horizontal bending jack showing the locking mechanism for the bending jack;

Fig. 10 is a top plan view of a twisting head;

Fig. 11 is a side elevation of the twisting head with parts sectioned to show the detail of construction;

Fig. 12 is a longitudinal central section of a cross bar bending jack;

Fig. 13 is a section taken on line 13—13 of Fig. 12; and

Fig. 14 is a diagrammatic view of the control mechanism.

The machine, in general, comprises frame elevating and transporting mechanism, and a plurality of jacks arranged to operate on a frame simultaneously or in groups to produce the desired forming of the frame.

The machine is adapted to set in a recess 1 in the floor 2, and is supported upon two structural beams 3 extending across the recess. The beams 3 support stringers 4 transversely thereof and which in turn support the machine bed 5.

The machine bed 5 is composed of a plurality of spaced slabs or slats extending longitudinally of the machine and having inverted T-slots 6 therebetween for the purpose of adjustably mounting machine elements on the bed, as hereinafter described.

The frame transporting mechanism comprises a pair of horizontal parallel rails 7 mounted above the machine for vertical movement and adapted to receive a frame 8 from a conveyor track 9 at one end of the rails, to deliver it to the machine for forming and thereafter to deliver it to another conveyor track 10 at the other end of the rails.

During the conveying of a frame, the rails are supported at a height above the machine which will insure the sliding frame full clearance over all parts of the machine. During operation of the machine upon a frame, the rails are supported just above the bed 5 and sufficiently low to permit the frame to be properly operated upon by the various jacks hereinafter described.

The rails 7 are supported by a transverse beam 11 at each end, by which they are raised and lowered in operation. The beams 11 have their ends disposed in vertically extending guideways of the upright channel posts 12 to insure proper vertical movement of the beams and rails.

Each beam 11 is supported on pivoted links connected to the ends of cranks 13 secured to a shaft 14 for limited rotation.

The shafts 14 are simultaneously rotated a predetermined amount to raise or lower the rails 7, by means of sprockets 15 mounted in alignment on the shafts and a chain 16 passing over the sprockets and secured at one end to the piston of a fluid pressure cylinder 17. The other end of the chain 16 is attached to the periphery of the sprocket farthest from the cylinder 17 as shown in Fig. 2. In operation the sprockets 15 rotate in opposite directions to raise the rails 7 and in the reverse directions to lower the rails. The cylinder 17 is so arranged that when fluid pressure is applied thereto the rails 7 are raised, and when the pressure is released the rails lower of their own weight.

Lowering of the rails 7 drops the frame 8 into position for operation of the machine proper. This comprises a plurality of fluid pressure operated jacks and bending devices mounted on the bed 5.

The frame 8 is supported in position on the bed 5 by means of four stationary jacks 18 which are adjustable to any desired height and location and which may be of any suitable construction. The frame is located by means of vertical guides 19 adjustably mounted on the bed 5 and having outwardly flaring upper ends 20 for receiving the frame as shown in Fig. 2.

The frame 8 is held down in position for the bending operations by means of fluid pressure operated hooks 21 which are mounted on the bed at any desired location.

The hold-down hooks 21, shown in detail in Fig. 4, each comprises a base 22 clamped to the bed 5 as will be hereinafter described, a vertically extending arm 23 pivoted thereon and a double acting air cylinder 24 pivotally mounted on the base.

The piston of the cylinder is double acting and is pivotally connected by a short horizontal link 25 with the upright arm 23. The operation of the cylinder moves the pivoted vertical arm into and out of upright position adjacent a frame element.

The upper end of the arm 23 has a block 26 mounted thereon for vertical adjustment and adapted to extend over a frame element and to hold the same from upward movement when the arm 23 is pivoted to upright position. For operation, the arm 23 is pivoted to the base 22 at a point directly below a frame element so that the hold-down block 26 transmits the upward pressure of the frame in a direct vertical line to the pivot point, thereby eliminating danger of overstressing the cylinder 24.

The block 26 may be adjusted vertically on the arm 23 to accommodate any height frame, by any suitable means. The adjustment illustrated is accomplished by a threaded post 27 secured to the arm 23 and extending upwardly parallel thereto. A nut 28 is mounted for rotation on the threaded post 27 and is disposed in a bifurcated portion of the block 26 so that threading of the nut up or down the post will raise or lower the block as desired.

Cooperating with the hooks 21 to give the frame a desired bend are raising jacks 29 mounted on the bed 5 at any desired location as hereinafter described. As shown in Figs. 5 and 6, the raising jack 29 comprises a hollow frame or casing 30 in which is mounted a hydraulic cylinder 31 and a pair of complementary angular jack blocks 32 and 33.

The jack blocks 32 and 33 are triangular in section, the upper block 32 being mounted for vertical movement between the upright end 34 of the casing 30 and the inclined surface 35 of the lower block 33, and the lower block being disposed in the casing 30 for horizontal movement to raise or lower the block 32 along the complementary inclined surfaces of the blocks.

The lower block 33 is moved horizontally by means of the hydraulic cylinder 31 which has a stationary head 36 and a movable piston 37 connected with the block 33. The stroke of the piston 37 and the consequent upward movement of the jack block 32 is limited by means of an adjustable nut 38 threaded on the short piston rod 39. The nut 38 is disposed to engage a partition 40 in the casing 30 when the piston has reached a predetermined distance in its stroke.

The nut 38 is locked in position on the rod 39 by any suitable means. That illustrated has been found to be simple and practical. It consists in cutting a transverse slot extending half way through the nut near one end of it and employing a screw 41 for flexing the thin end portion 42 of the nut to tighten it on the threads of the rod 39, as shown in Fig. 6.

The upward bending of the frame may be determined to some extent by employing a suitable number of shims 43 on top of the jack block 32 as shown more clearly in Fig. 6. For operation the raising jack 29 is located to position the block 32 beneath a frame element at a predetermined location to raise the frame element.

The jack block 32 is lowered by means of an air cylinder 44 at the opposite end of casing 30. This cylinder has a stationary piston 45 through which the air ports 46 extend for operating the cylinder, and a movable head 47. Long rods 48 extend longitudinally through the casing 30, having their inner ends threaded into the jack block 33 and their outer ends passing through lugs 49 on the cylinder head 47 and capped by adjustable nuts 50.

In Fig. 1 four hold-down hooks 21 are shown, two at each end of the frame. Also, two raising jacks 29 are shown positioned at the rear kickup of the frame. Operation of the jacks as shown in cooperation with the hold-down hooks will tend to increase the rear kickup of the frame.

Other arrangements of the hold-down hooks and raising jacks may be employed to meet the need as to any particular frame. For instance, should it be desirable to give the frame as a whole a torsional twist, this may be accomplished by placing two hold-down hooks near diagonally opposite corners and two raising jacks at the other diagonally opposite corners. Operation of the jacks will then effect a twisting of the frame a predetermined amount as determined by the adjustment of the jacks.

The horizontal bending jack 51, shown in detail in Figs. 7, 8, and 9, comprises a base 52, a horizontally movable jaw 53 for receiving the side bar of the frame 8, a double cylinder 54 for moving the jaw in either direction, and mechanism for limiting the stroke of the cylinder.

The base 52 is secured to the bed 5 by means of L-shaped clamps 55 and bolts 56. The bolts 56 have specially shaped heads 57 for insertion in the T-slots 6 and which prevent free turning of the bolt or removal of the same from the slot. The bolts are tightened by means of nuts 58 threaded on their upper ends and which hold the clamping elements 55 in position. The same clamping means is employed in securing all jacks and adjustable parts to the bed 5.

The forward end of the base 52 has mounted thereon two stationary piston heads 59 and 60, one facing forward and the other rearward. Fitting over the piston heads 59 and 60 are cylinders 61 and 62, respectively, constituting the double cylinder 54. Fluid pressure, preferably hydraulic, is admitted to the cylinder 61 through a suitable passage 63 in the stationary piston 59 for operating the cylinder while a constant air pressure is admitted to cylinder 62 through a similar passage in head 60.

The jaw 53 is of U-shape in the vertical longitudinal plane of the jack and has an upper rearwardly extending support 64 above the double cylinder 54 and a lower rearwardly extending support 65 disposed in a guideway 66 in the lower forward end of the base 52. The jaw 53 is mounted for forward and rearward movement on the base 52, the support 64 having horizontal key-slot connections with portions of the base 52 at 67 for this purpose.

The forward cylinder 61 engages the rear side of the jaw to push the jaw forward when fluid pressure is admitted to the cylinder, and the rear cylinder 62 engages a downward extension on the support 64 to push the jaw rearward when the fluid pressure admitted to the cylinder is greater than that in cylinder 61.

Either stroke of the cylinder may be a power stroke, as desired, depending upon whether a push or pull movement is required on the frame element. In case a pull stroke is desired, cylinder 62 is connected to the source of hydraulic pressure and cylinder 61 is connected to the source of constant air pressure.

The extent of the stroke of the cylinders and consequent movement of the jaw is limited in each direction by the mechanism 68. A threaded rod 69 extends rearwardly from the support 64 through an opening in an upward extension 70 at the rear of the base 52. A nut 71 is threaded on the rod 69 between the support 64 and the extension 70 and another nut 72 is threaded on the end of the rod rearwardly of the extension. The position of nut 71 on the rod 69 determines the engaging of the nut with the extension 70 during rearward movement of the jaw 53, and adjustment of the nut determines the rearward stroke of the jaw. Likewise, the position of the nut 72 on the rod 69 determines the engaging of the nut with the extension 70 during forward movement of the jaw 53, and adjustment of this nut determines the forward stroke of the jaw.

After adjustment, the nuts 71 and 72 may be locked by any suitable means. That illustrated comprises a spring pressed slidable metal strip 73 having a rib 74 on its underside for engagement in slots 75 of the rear nut 72 and having a downward projection 76 at its forward end for engagement in holes 77 in the periphery of the forward nut 71. The strip 73 may be raised to disengage the same from either nut when adjusting the nuts. The strip 73 is movable with the nuts during operation of the jack and locks the same from rotating on the rod 69.

In Figs. 1 to 3, inclusive, several horizontal bending jacks 51 are shown, and it is understood that any suitable number may be employed at the required locations along the frame. As illustrated, a jack 51 is provided at the forward end of the frame for pulling each side bar outwardly or holding the same against an inward thrust, and a jack 51 is provided just rear of the second rail 7 for the same purpose. An inwardly thrusting or pushing jack 51 is shown between these two and at the center of the frame on each side to bend the side bars inwardly. Thus the jacks 51 cooperate with each other in giving a lateral bend to the side bars.

The jacks 51 are also employed in many cases to twist the side bars to a predetermined shape. For this purpose the jaws 53 have adjustable bumper blocks 78 which may be positioned on either side of the U-shaped jaw and at the required height to engage either the top or bottom corner of the side bar during bending. By having the blocks 78 on the two pulling jaws engage the upper left-hand corner or flange edge of the side bar, and the block of the thrust or push jaw engage the lower web corner of the side bar (as shown in Fig. 8), the side bar will be given a twist clockwise. A counter-clockwise twist may be provided if desired.

Twisting of the side bar in this way may be used to counteract and cooperate with the twisting of the end spring hangers as hereinafter described.

Figs. 10 and 11 show the spring hanger twisting mechanism or jack 79. This mechanism comprises in general a base 80, a twisting head 81 operated by a rack and pinion 82, a double cylinder 83 for operating the rack and means 84 for limiting the stroke of the cylinders in both directions.

The twisting head 81 is a rotatable drum having a slot 85 in its outer face for receiving the spring hanger or end of the frame element, and mounted on a horizontal shaft 86 extending transversely of the base 80. The shaft is rotated by means of the rack and pinion 82.

The rack is connected by a reciprocating frame 87 to the opposite ends of the cylinders 83. The cylinders 83 are of similar construction to the cylinders 54 of the horizontal bending jacks 51, being capable of connection to exert a power stroke in either direction, and need not be described in further detail.

The mechanism 84 for adjusting and limiting the stroke of the cylinders 83 and the consequent twisting of the head 81 is similar in construction to the mechanism 68 employed for the same purpose in the horizontal bending jacks 51.

In Fig. 1 a twisting jack 79 is provided for each end of each side bar, and is ordinarily used for turning the spring hanger to align the same with the cooperating spring hanger on the frame. Twisting of the entire side bar may be prevented by employing horizontal bending jacks at suitable locations as previously described.

All of the jacks 29, 51, and 79 as well as the hold-down hooks 21 and stationary jacks 18 are constructed to require a minimum of space, both vertically and also longitudinally of the frame. In the machine constructed each jack requires less than seven inches of space in width, so that a large number of jacks may be mounted along each side of a frame as desired. As many as thirty different jacks have been employed on a single frame at one time.

In some instances it is desirable to bend a cross bar intermediate its ends either forwardly or rearwardly of the frame. For this purpose a cross bar bending jack 88 is employed.

As shown in Figs. 12 and 13, this jack comprises a short box-like base 89 having its top open at the center, and an upright post 90 extending through the opening. Inside the box at each end is a circular stationary piston head 91. The lower end of the post 90 is formed as two cylinders 92 fitting over the pistons 91 and disposed for reciprocation thereon in the base 89. Reciprocation of the cylinders 92 effects lateral movement of the post 90. The upper end of the post 90 has adjustably mounted thereon a facing block 93 adapted to engage the cross bar to be bent and adjustable as to height.

Fluid pressure is admitted to either cylinder through suitable connections through the stationary pistons 91, and the jack is adapted to operate its power stroke in either direction similar to the operation of the horizontal bending jacks 51.

Adjustable stops 94 of any suitable construction are provided for limiting the movement of the jack in either direction.

The machine is operated by means of a control mechanism illustrated in Fig. 14. This comprises a plurality of manually operated valves for initiating and effecting movement of the various jacks simultaneously or in predetermined sequence or groups.

The elevator cylinder 17 is controlled by valve 95 placed in the fluid pressure feed line 96 and which in its open position admits fluid pressure to the cylinder and in its closed position exhausts fluid pressure from the cylinder.

The air cylinders 24 of the hold-down hooks 21 are operated through lines 97 and 98 from a single air pressure line 99 and are controlled simultaneously by means of the two-way valve 100 connecting line 99 with lines 97 and 98.

The cylinders 31 of the raising jacks 29 are operated simultaneously by a valve 101 in the common fluid pressure feed line 102. The air cylinders 44 of the jacks 29 are connected directly with a source of constant air pressure through feed line 103.

The cylinders 61 of the horizontal bending jacks 51 are controlled by valve 104 in the common fluid pressure feed line 105. Turning of the valve 104 in one direction admits fluid pressure to the operating cylinder of the jacks through feed line 105, while turning of the valve in the other direction exhausts the operating cylinders. The retracting cylinders 62 are connected to air line 103.

The operating cylinders 83 of the twisting jacks 79 are preferably connected to feed line 106 so as to be operated by means of valve 107 placed in line 106. The retracting cylinders are connected to air line 103. However, the power cylinders 83 may be connected to the line 105 and be operated simultaneously with the bending jacks 51 by means of valve 104, if desired.

Likewise, the operating cylinders of the cross bar bending jacks 88 are preferably connected to the feed line 105 to be controlled by valve 104 simultaneously with the bending jacks 51. The retracting cylinders are connected to air line 103.

The valves 95, 100, 101, 104 and 107 are all located within convenient reach of a single attendant and in operating the machine the procedure is preferably as follows:

When a frame 8 has reached the center of the machine on tracks 7, the attendant closes valve 95 which exhausts the cylinder 17 and allows the tracks to drop, lowering the frame into position between guides 19 until it rests on the stationary jacks 18. Then valve 100 is operated to move the hold-down hooks 21 into position for holding the frame down. Valve 101 is then opened to operate the raising jacks 29 and bend portions of the frame vertically. Reversal of valve 101 then exhausts the operating cylinders of the jacks 29, and the constant air pressure fed through line 103 to the retracting cylinders effects a return of the jacks to normal position.

The horizontal bending jacks 51 and cross bar bending jacks 88 are next operated simultaneously by means of valve 104. After return of these jacks to normal position, the twisting heads 79 are operated and released through valve 107, after which the hold-down hooks 21 are released by reversing valve 100. Then fluid pressure is admitted to cylinder 17 through valve 95 to raise the frame 8 out of the machine on rails 7.

The cycle of operation per frame is short, being of the order of about 15 seconds, so that the machine is particularly well adapted for factory production work. The machine may be readjusted to form a different size or type of frame in a few hours' time so that it will meet any need of the factory. The simple construction of the various parts of the machine reduces maintenance and repair costs materially and facilitates adjustment.

Various embodiments of the invention may be employed within the scope of the accompanying claims.

I claim:

1. A forming machine for automobile frames and the like, comprising a bed and a plurality of fluid pressure operated jacks, some of which are arranged to cooperate in bending an element of the frame in a vertical direction a predetermined amount at a predetermined location, some of which are arranged to cooperate in bending an element of the frame in a horizontal direction a predetermined amount at a predetermined location and some of which are arranged to twist an element of the frame a predetermined amount at a predetermined location, all of said jacks being adjustable and being mounted adjustably on said bed for cooperation in forming frames of different sizes.

2. A forming machine for automobile frames and the like, comprising a bed, a plurality of fluid pressure operated jacks, some of which are arranged to cooperate in bending elements of the frame in a vertical direction predetermined amounts at predetermined locations, some of which are arranged to cooperate in bending elements of the frame in a horizontal direction predetermined amounts at predetermined locations and some of which are disposed to twist elements of the frame predetermined amounts at predetermined locations, all of said jacks being adjustable and being mounted adjustably on said bed for cooperation in forming frames of different sizes, and means for operating the jacks for each type of bending operation simultaneously.

3. A forming machine for automobile frames and the like, comprising a bed, means thereon for receiving and holding a frame for bending operations, means for delivering frames successively to said receiving means, a plurality of jacks adjustably mounted on said bed and disposed to cooperate in performing predetermined bending operations, and means for operating said jacks in cooperative relation.

4. A forming machine for automobile frames and the like, comprising a bed, means thereon for receiving and holding a frame for bending operations, a plurality of jacks adjustably mounted on said bed and disposed to cooperate to bend elements of the frame in a vertical direction predetermined amounts at predetermined locations, and means for operating said jacks simultaneously.

5. A forming machine for use in manufacturing automobile frames and the like, comprising a bed, means thereon for receiving and holding a frame for bending operations, a plurality of jacks adjustably mounted on said bed and disposed in opposed relation to cooperate to bend corresponding elements of the frame in a horizontal direction predetermined amounts at predetermined locations, and means for operating said jacks simultaneously.

6. A forming machine for use in manufacturing automobile frames and the like, comprising a bed, means thereon for receiving and holding a frame for bending operations, means adjustably mounted on said bed for bending elements of the frame predetermined amounts at predetermined locations, means adjustably mounted on said bed for twisting elements of the frame predetermined amounts at predetermined locations, and means for operating said bending and twisting means.

7. A forming machine for automobile frames and the like, comprising a bed, means thereon for receiving and holding a frame for bending operations, a plurality of jacks adjustably mounted on said bed and disposed to cooperate to bend elements of the frame in a vertical direction at predetermined locations, a plurality of jacks adjustably mounted on said bed and disposed to cooperate to bend elements of the frame in a horizontal direction at predetermined locations, means adjustably mounted on said bed for twisting elements of the frame at predetermined locations, and means for operating said bending jacks and twisting means in cooperative relation.

8. A forming machine for use in manufacturing automobile frames and the like, comprising a bed, means thereon for receiving and holding a frame for bending operations, a plurality of jacks adjustably mounted on said bed and disposed to cooperate in bending and twisting elements of the frame predetermined amounts at predetermined locations, and means for operating said jacks simultaneously.

9. A forming machine for automobile frames and the like, comprising means for receiving and holding a frame for bending operations, a plurality of jacks disposed to cooperate to bend elements of the frame in a vertical direction at predetermined locations, a plurality of jacks disposed to cooperate to bend elements of the frame in a horizontal direction at predetermined locations, means for twisting elements of the frame at predetermined locations, and means for operating said bending jacks and twisting means in cooperative relation.

10. In a machine for forming automobile frames and the like, a bed, means for receiving and supporting a frame on said bed for bending operations, and a plurality of narrow fluid pressure operated jacks adjustably mounted on said bed for performing bending operations, said jacks being arranged side by side on each side of the frame at predetermined required locations relative to the frame depending upon the desired bending operations to be performed.

11. In a machine for forming automobile frames and the like, a bed, means thereon for receiving and holding a frame for bending operations, a plurality of fluid pressure operated jacks adjustably mounted on said bed for performing bending operations in a plurality of directions, said jacks being narrow in a direction longitudinally of the frame and being arranged side by side on each side of the frame at predetermined required locations relative to the frame for bending the latter in the desired direction at predetermined points, and means for operating said jacks in cooperative relation.

12. In a machine for forming automobile frames and the like, a bed, means thereon for receiving and supporting a frame for bending operations, means on said bed for performing predetermined bending operations on the frame, said means having jaws opening vertically to receive the frame, and means for transferring a frame in a vertical direction to said jaws and for removing the same in a vertical direction therefrom.

13. In a machine for forming automobile frames and the like, a bed, means for receiving and supporting a frame on said bed for bending operations, and a plurality of narrow fluid pressure operated jacks adjustably mounted on said bed for performing bending operations, said jacks being arranged side by side on each side of the frame at predetermined required locations relative to the frame depending upon the desired bending operations to be performed and having vertically opening jaws for receiving a frame when the latter is lowered into said machine.

14. A forming machine for use in manufacturing automobile frames and the like, comprising a bed, means thereon for receiving a frame, fluid pressure actuated means for holding the frame in position for bending operations, a plurality of fluid pressure actuated jacks for performing bending operations upon the frame, and means for operating said holding means and said jacks in cooperative relation.

15. A forming machine for use in manufacturing automobile frames and the like, comprising means for receiving a frame, fluid pressure actuated means for holding the frame against vertical displacement during bending operations, a plurality of fluid pressure actuated jacks disposed to cooperate to bend elements of the frame in a vertical direction, and means for operating said holding means and said jacks in cooperative relation.

16. A forming machine for use in manufacturing automobile frames and the like, comprising a bed, a plurality of jacks adjustably mounted on said bed in opposed relation and disposed for bending elements of the frame predetermined amounts at predetermined locations, means carried by said jacks and limiting the relative movement of the opposed pressure-receiving elements thereof to thereby predetermine the amounts of said bending movements, and means for operating said jacks simultaneously.

17. A forming machine for use in manufacturing automobile frames and the like, comprising a plurality of fluid pressure operated jacks disposed for bending elements of the frame in different directions predetermined amounts at predetermined locations, means carried by said jacks and limiting the relative movement of the opposed pressure-receiving elements thereof to thereby predetermine the amounts of said bending movements, and means for operating said jack in successive cooperating groups according to the direction of the bending.

18. A forming machine for use in manufacturing automobile frames and the like, comprising means for receiving and holding a frame for bending operations, a plurality of jacks disposed in opposing relation to cooperate to bend corresponding elements of the frame in a horizontal direction predetermined amounts at predetermined locations, means carried by said jacks and limiting the relative movement of the opposed pressure-receiving elements thereof to thereby predetermine the amounts of said bending movements, and means for operating said jacks simultaneously.

19. A forming machine for use in manufacturing automobile frames and the like, comprising a bed and a plurality of jacks, some of which are arranged to cooperate in bending an element of the frame a predetermined amount in one direction at a predetermined location, and some of which are arranged to bend an element of the frame a predetermined amount in a different direction at a predetermined location, and means carried by said jacks to limit the amounts of their relative movement in performing the bending operations, all of said jacks being adjustable and being adjustably mounted on said bed for cooperation in forming frames of different sizes.

WARREN F. HEINEMAN.